United States Patent
Krabbenborg

(10) Patent No.: US 6,329,454 B1
(45) Date of Patent: Dec. 11, 2001

(54) FILLED PROPYLENE POLYMER COMPOSITION

(75) Inventor: Franciscus J. T. Krabbenborg, Terneuzen (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/457,035

(22) Filed: Dec. 8, 1999

(51) Int. Cl.⁷ ............... C08K 5/20; C08F 110/06
(52) U.S. Cl. ............ 524/252; 525/240; 526/160; 526/161; 526/943; 526/352; 524/451
(58) Field of Search ............... 524/451, 252; 526/351, 160, 161, 943; 525/130, 240, 242, 245, 88

(56) References Cited

U.S. PATENT DOCUMENTS

| | | | |
|---|---|---|---|
| 3,236,917 | 2/1966 | Natta et al. | 260/878 |
| 3,424,703 | 1/1969 | Jones, Jr. | 260/18 |
| 4,950,541 | 8/1990 | Tabor et al. | 428/373 |
| 5,091,461 | 2/1992 | Skochdople | 524/493 |
| 5,194,509 | 3/1993 | Hasenbein et al. | 525/285 |
| 5,391,618 | 2/1995 | Yamamoto et al. | 525/88 |
| 5,576,374 | 11/1996 | Betso et al. | 524/451 |
| 5,639,829 | 6/1997 | Yamaguchi et al. | 525/240 |
| 5,670,595 | 9/1997 | Meka et al. | 526/336 |
| 5,770,664 | 6/1998 | Okumura et al. | 526/127 |
| 5,814,714 | 9/1998 | Palomo et al. | 526/336 |

FOREIGN PATENT DOCUMENTS

| | | |
|---|---|---|
| 0 639 613 A1 | 2/1995 | (EP) . |
| 0 391 413 B1 | 12/1996 | (EP) . |
| 765905 | 4/1997 | (EP) . |
| 0 908 492-A1 * | 4/1999 | (EP) . |
| 908492 | 4/1999 | (EP) . |

OTHER PUBLICATIONS

Modern Plastics Encyclopedia/89, mid Oct. 1988 Issue, vol. 65, No. 11, pp. 86–92.

* cited by examiner

Primary Examiner—Bernard Lipman
Assistant Examiner—R. Harlan

(57) ABSTRACT

Disclosed are propylene polymer compositions comprising a polypropylene, an interpolymer prepared from a metallocene catalyst, and a filler. Said propylene polymer compositions have improved processability with a good balance of stiffness and toughness and demonstrate improved scratch resistance in injection molded articles.

22 Claims, No Drawings

FILLED PROPYLENE POLYMER COMPOSITION

FIELD OF THE INVENTION

This invention relates to propylene polymer compositions comprising a polypropylene, an interpolymer prepared from a metallocene catalyst, and a filler. This invention relates particularly to a propylene polymer composition having improved processability with a good balance of stiffness and toughness which demonstrates improved scratch resistance in injection molded articles.

BACKGROUND OF THE INVENTION

Polypropylene, especially highly isotactic polypropylene, has been used in many applications in the form of molded articles, film, sheet, etc., because it is excellent in molding processability, toughness, moisture resistance, gasoline resistance, chemical resistance, has a low specific gravity, and is inexpensive. The use of polypropylene polymers is expanding at an increasing rate in the fields of exterior and interior automotive trims, in electrical and electrical equipment device housing and covers as well as other household and personal articles.

However, polypropylene is poor or inadequate in heat resistance, stiffness, scratch resistance and impact resistance. These deficiencies are obstacles to opening up new applications for polypropylene, particularly applications which have traditionally been injection molded. In order to overcome these shortcomings, especially inadequate impact resistance, polypropylene has been blended with a rubbery elastic material such as ethylene-propylene copolymer rubber, ethylene-propylene-diene copolymer rubber or ethylene-butene copolymer rubber. For examples, see U.S. Pat. No. 5,391,618 which discloses low crystalline polypropylene polymer compositions comprising an ethylene alpha-olefin copolymer, U.S. Pat. No. 5,576,374 which discloses polypropylene polymer compositions comprising a substantially linear ethylene polymer and U.S. Pat. No. 5,639,829 which discloses propylene polymer compositions comprising an ethylene and 1-butene random copolymer. However, while impact properties are improved these propylene polymer compositions do not achieve a good balance of stiffness and toughness.

In view of the deficiencies of the conventional propylene polymers and blends thereof, it would be highly desirable to provide a propylene polymer composition which exhibits improved processability with a good balance of stiffness and toughness which demonstrates improved scratch resistance in injection molded articles.

SUMMARY OF THE INVENTION

The present invention is such a desirable propylene polymer composition. The composition possesses a desirable balance of improved processability with a good balance of stiffness and toughness which demonstrates improved scratch resistance in injection molded articles. The propylene polymer composition of the present invention comprises from about 40 to about 85 parts by weight of an isotatic propylene polymer, from about 10 to about 55 parts by weight of an interpolymer prepared from a metallocene catalyst having a density, d, of from about 0.85 to about 0.97 grams per cubic centimeter (g/cm$^3$), a melt flow rate, $I_2$, from about 0.001 to about 50 grams per 10 minutes (g/10 min.) and a melt tension of the interpolymer satisfying the following relationship:

$$MT > 1.328 - 0.7879 \log(I_2) + 22.5(d-0.85) - 40.56\{\log(I_2)\} \times (d-0.85)$$

wherein MT represents the melt tension in grams, preferably an interpolymer comprising ethylene, an alpha-olefin containing 3 to 18 carbon atoms, and a non-conjugated alpha-omega diene having at least 7 carbon atoms and having two readily polymerizable double bonds, from 5 to about 50 parts by weight of a filler, and from 0 to about 15 parts by weight of an additional polymer, parts by weight based on the weight of the total composition.

In another aspect, the present invention is a process for preparing a propylene polymer composition described hereinabove which exhibits a desirable balance of improved processability with a good balance of stiffness and toughness which demonstrates improved scratch resistance in injection molded articles wherein a propylene polymer is blended with an effective amount of an interpolymer prepared from a metallocene catalyst, a filler and optionally an additional polymer.

In a further aspect, the present invention involves a method of molding or extruding a propylene polymer blend composition described hereinabove.

In yet a further aspect, the invention involves molded or extruded articles of a propylene polymer blend composition described hereinabove. The propylene polymer compositions of the present invention are especially useful in the preparation of molded objects notably articles having large surfaces prepared by injection molding techniques requiring a good balance of strength and toughness and good scratch resistance. Such properties are particularly desired for exterior and interior automotive trims, for example, bumper beams, bumper fascia, pillars, instrument panels and the like; in electrical and electrical equipment device housing and covers; as well as other household and personal articles, including, for example, appliance housings, housewares, freezer containers, and crates; lawn and garden furniture; building & construction sheet, etc.

DETAILED DESCRIPTION OF THE EMBODIMENTS

Component (a) in the propylene polymer compositions of this invention is a polypropylene. The polypropylene suitable for use in this invention is well known in the literature and can be prepared by known techniques. In general, the polypropylene is in the isotatic form, although other forms can also be used (e.g., syndiotatic or atatic). The polypropylene used for the present invention is preferably a homopolymer of polypropylene or a copolymer, for example, a random or block copolymer, of propylene and an alpha-olefin, preferably a $C_2$ or $C_4$ to $C_{20}$ alpha-olefin. The alpha-olefin is present in the polypropylene of the present invention in an amount of not more than 20 percent by mole, preferably not more than 15 percent, even more preferably not more than 10 percent and most preferably not more than 5 percent by mole.

Examples of the $C_2$ and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

In the present invention, a propylene homopolymer is the preferred polypropylene.

The polypropylene of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichoride which contains as essential components titanium, magnesium and a halogen; as an organometalic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Polypropylene is commonly made by catalytically reacting propylene in a polymerization reactor with appropriate molecular weight control agents. Nucleating agents may be added after the reaction is completed during a melt processing step in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in Modern *Plastics Encyclopedia*/89, mid October 1988 Issue, Volume 65, Number 11, pp. 86–92, the entire disclosure of which is incorporated herein by reference. The molecular weight of the polypropylene for use in the present invention is conveniently indicated using a melt flow measurement, sometimes referred to as melt flow rate (MFR) or melt index (MI), according to ASTM D 1238 at 230° C. and an applied load of 2.16 kilogram (kg). Melt flow rate is inversely proportional to the molecular weight of the polymer. Thus, the higher the molecular weight, the lower the melt flow rate, although the relationship is not linear. The melt flow rate for the polypropylene useful herein is generally greater than about 0.1 g10 min., preferably greater than about 0.5 g10 min., more preferably greater than about 1 g/10 min., and even more preferably greater than about 10 g/10 min. The melt flow rate for the polypropylene useful herein is generally less than about 200 g/10 min., preferably less than about 100 g/10 min., more preferably less than about 75 g/10 min., and more preferably less than about 50 g/10 min.

The polypropylene polymer as component (a) may be characterized also by its crystalline structure.

One method to characterize crystallinity is by the pulse nuclear magnetic resonance (NMR) method of K. Fujimoto, T. Nishi and R. Kado, Polymer Journal Volume 3, 448–462 (1972) wherein crystalline phase (I), intermediate phase (II) and amorphous (III) phase are determined. Generally, the weight ratio of the crystalline phase (I)/the intermediate phase (II) is greater than about 4, preferably greater than about 5, more preferably greater than about 8 and most preferably greater than about 10. The content of the amorphous phase (III) is from at least about 1, preferably from at least about 2, more preferably from at least about 5, even more preferably from at least about 10 and most preferably from at least about 15 weight percent. The content of the amorphous phase (III) is less than about 40, preferably less than about 30, more preferably less than about 25, even more preferably less than 20 and most preferably less than about 15 percent by weight.

Generally, in pulse NMR determinations, an energy pulse is applied to a spinning polymer sample at high resolution over a specified range of temperature at specific temperature intervals (temperature in degrees Kelvin, °K). The resulting energy is monitored in the time domain (microsecond time scale). The energy/time curve is a measure of the time needed for the polymer to return from the excited energy state back to its ground energy level. This is called the Free Induction Decay (FID) curve. The curve is then mathematically broken down into a fast Gaussian equation (usually associated with crystallinity), a slow Gaussian equation and one exponential equation. The last two equations are usually associated with the polymers amorphous phase and an intermediate phase that is between the crystallinity and amorphous properties, respectively. These equations are used to calculate coefficients that characterize the appropriate amplitude and time components of the FID curve. The coefficients are then placed in a matrix and undergo regression processes such as partial least squares. The crystalline, amorphous, and intermediate phases are calculated and reported as weight percents as a function of temperature, °K.

However, a more preferable method of determining crystallinity in the polypropylene polymer is by differential scanning calorimetry (DSC). A small sample (milligram size) of the propylene polymer is sealed into an aluminum DSC pan. The sample is placed into a DSC cell with a 25 centimeter per minute nitrogen purge and cooled to about –100° C. A standard thermal history is established for the sample by heating at 10° C. per minute to 225° C. The sample is then cooled to about –100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity, }\% = \frac{\Delta H_{observed}}{\Delta H_{isotactic\ PP}} \times 100$$

where the heat of fusion for isotactic polypropylene ($\Delta H_{isotactic\ PP}$), as reported in B. Wunderlich, Macromolecular Physics, Volume 3, Crystal Melting, Academic Press, New Your, 1980, p 48, is 165 Joules per gram (J/g) of polymer.

The degree of crystallinity for the high crystalline propylene polymer as determined by DSC is at least about 62 weight percent, preferably at least about 64 weight percent, more preferably at least about 66 weight percent, even more preferably at least about 68 weight percent and most preferably at least about 70 weight percent based on the weight of the high crystalline propylene polymer. The degree of crystallinity for the high crystalline propylene polymer as determined by DSC is less than or equal to about 100 weight percent, preferably less than or equal to about 90 weight percent, more preferably less than or equal to about 80 weight percent, and most preferably less than or equal to about 70 weight percent based on the weight of the high crystalline propylene polymer.

Part or all of the propylene polymer of the present invention may be graft modified. A preferred graft modification of the polypropylene is achieved with any unsaturated organic compound containing, in addition to at least one ethylenic unsaturation (e.g., at least one double bond), at least one carbonyl group (—C=O) and that will graft to a polypropylene as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound containing at least one carbonyl group can be grafted to the polypropylene by any known technique, such as those taught in U.S. Pat. No. 3,236,917 and U.S. Pat. No. 5,194,509. For example, polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. Alternatively, the reaction temperature is higher, e.g., 210° C. to 300° C., and a free radical initiator is not used or is used at a reduced concentration. An alternative and preferred method of grafting is taught in U.S. Pat. No. 4,905,541, the disclosure of which is incorporated herein by reference, by using a twin-screw devolatilizing extruder as the mixing apparatus. The polypropylene and unsaturated organic compound are mixed and reacted within the extruder at temperatures at which the reactors are molten and in the presence of a free radical initiator. Preferably, the unsaturated organic compound is injected into a zone maintained under pressure in the extruder.

The unsaturated organic compound content of the grafted polypropylene is at least about 0.01 weight percent, preferably at least about 0.1 weight percent, more preferably at least about 0.5 weight percent, and most preferably at least about 1 weight percent based on the combined weight of the polypropylene and organic compound. The maximum amount of unsaturated organic compound content can vary to convenience, but typically it does not exceed about 10 weight percent, preferably it does not exceed about 5 weight percent, more preferably it does not exceed about 2 weight percent and most preferably it does not exceed about 1 weight percent based on the combined weight of the polypropylene and the organic compound.

The polypropylene or graft-modified polypropylene is employed in the propylene polymer blend compositions of the present invention in amounts sufficient to provide the desired processability and good balance of stiffness and toughness. If present, the graft-modified polypropylene can be employed in an amount equal to 100 weight percent of the total weight of the polypropylene, preferably in an amount up to or equal to 50 weight percent, more preferably up to or equal to 30 weight percent, even more preferably up to or equal to 20 weight percent and most preferably up to or equal to 10 weight percent of the weight of the polypropylene.

In general, the polypropylene, graft-modified polypropylene or mixture thereof is employed in an amount of at least about 40 parts by weight, preferably at least about 45 parts by weight, more preferably at least about 50 parts by weight, even more preferably at least about 55 parts by weight, and most preferably at least about 60 parts by weight based on the weight of the total composition. In general, the polypropylene, graft-modified polypropylene or mixture thereof is used in amounts less than or equal to about 95 parts by weight, preferably less than or equal to about 90 parts by weight, more preferably less than or equal to about 80 parts by weight, even more preferably less than or equal to about 70 parts by weight, and most preferably less than or equal to about 60 parts by weight based on the weight of the total composition.

Suitable interpolymers employed in the present invention as component (b) are well known in the literature and can be prepared by known techniques, for example suitable methods are disclosed in U.S. Pat. No. 5,814,714, which is hereby incorporated by reference in its entirety. In general, the interpolymers used in the present invention are prepared from a single site catalyst or a constrained geometry catalyst referred to generally as metallocene catalysts. Preferred interpolymers used in the present invention comprise a mono-olefin selected from the group of alpha-olefins and cyclic olefins, and a non-conjugated polyene. Said preferred interpolymers prepared from a metallocene catalyst have high melt tension properties and good processability properties comparable to those of olefin-based linear polymers or interpolymers of the same density and melt flow rate lacking the polyene.

Melt tension (MT) is measured by a specially designed pulley transducer in conjunction with a melt indexer. Melt tension is the load that the extrudate or filament exerts while passing over the pulley at the speed of 50 rpm. The melt indexer is operated at 190° C. and the polymer is extruded under a weight of 2160 grams (g) through a vertical die with a diameter of 2.1 millimeters (mm) and a length/diameter ratio of 3.82. The molten strand crosses an air gap of 45 centimeters (cm) until it is stretched by a take-up roll gyrating at 50 revolutions per minute (rpm). The tensile force, or melt tension, required for this stretching is measured by a force cell and expressed in grams. The melt tension measurement is similar to the "Melt Tension Tester" made by Toyoseiki and is described by John Dealy in *Rheometers for Molten Plastics*, published by Van Nostrand Reinhold Co. (1982) on pp. 250–251.

The interpolymers used in the present invention are different from the prior art linear olefin-based polymers and copolymers and from the prior art substantially linear olefin-based polymers and copolymers in a sense that, at about the same melt index ($I_2$) and density (d), the number average molecular weight of the present interpolymer is lower than that of the substantially linear olefin-based polymers and interpolymers which, again, is lower than that of the prior art linear olefin-based polymers and interpolymers.

Preferably, the present interpolymers have melt tension properties satisfying the following relationship:

$$MT>1.7705-1.0504\log(I_2)+30.00(d-0.85)-54.09\{\log(I_2)\}\times(d-0.85)$$

wherein MT, $I_2$, and d have the definitions given above.

Preferably, the interpolymers used in the present invention have melt tension properties which are at least 35 percent higher, and preferably at least 50 percent higher than the melt tension of a similar polymer of substantially the same density and melt index yet containing no polyene. Interpolymers containing alpha-omega dienes of at least 10 carbon atoms, such as 1,9-decadiene, can have the same melt tension properties as those containing, for example, alpha-omega dienes of 8 carbon atoms or less, such as, for example, 1,7-octadiene, yet at significantly lower diene contents. In very preferred embodiments, the MT of the present interpolymers approaches or improves that of high pressure, free radical polymerized low density polyethylene (LDPE) having the same melt index.

Preferred mono-olefins incorporated in the interpolymers are alpha-olefins having from 2 to 20 carbon atoms (including ethylene) and cyclic olefins. Examples of the alpha-olefins having 3 to 20 carbon atoms include propylene, 1-butene, 3-methyl- 1-butene, 1-pentene, 3-methyl- 1-pentene, 4-methyl-1-pentene, 1-hexene, 1-heptene, 4,4-dimethyl-1-pentene, 3-ethyl-1-pentene, 1-octene, 1-nonene, 1-decene, 1-dodecene, 1-tetradecene, 1-hexadecene, 1-octadecene and 1-eicosene. Furthermore, the cyclic olefins preferably have 3 to 20 carbon atoms, and typical examples of the cyclic olefins include cyclopentene, cyclohexene, norbornene, 1-methylnorbornene, 5-methylnorbornene, 7-methylnorbornene, 5,6-dimethylnorbornene, 5,5,6-trimethylnorbornene, 5-ethylnorbornene, 5-propylnorbornene, 5-phenylnorbornene and 5-benzylnorbornene.

Preferably, the alpha-olefin comprises ethylene and optionally a further alpha-olefin containing from 3 to 18 carbon atoms. More preferably, the alpha-olefin comprises ethylene and a further alpha-olefin containing from 3 to 12 carbon atoms. Especially preferred further alpha-olefins contain from 4 to 8 carbon atoms, such as 1-butene, 1-pentene, 1-hexene, 4-methyl-1-pentene, and 1-octene.

The term readily polymerizable double bond as used in the present invention in connection with the term polyene means a double carbon-carbon bond which is a terminal carbon-carbon double bond or a carbon-carbon double bond in a strained-ring structure. The polyene used in the present interpolymer is a non-conjugated polyene. Preferably, the two readily polymerizable bonds are of about the same or equal reactivity under the polymerization conditions employed. Preferred non-conjugated polyenes are at least 7 carbon atoms having two readily polymerizable double bonds and include straight-chain or branched acyclic diene compounds. Preferably, the polyenes have up to 35 carbon atoms.

Examples of the straight-chain or branched acyclic diene compounds include 1,6-heptadiene, 1,7-octadiene, 1,8-nonadiene, 1,9-decadiene, 1,11-dodecadiene, 1,13-tetradecadiene, and lower alkyl substituted derivatives thereof; examples of the monocyclic acyclic diene compounds include 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinyl-cyclooctane, 1,5-diallylcyclooctane, and lower alkyl substituted derivatives thereof. Other suitable polyenes include bicyclo-(2,2,1)-hepta-2,5-diene (norbornadiene), the dimer of norbornadiene, and diolefins having two strained ring double bonds, such as the reaction product obtained by reacting 2,5-norbornadiene with cyclopentadienyl-1,4,4a,5,8,8a-hexahydro-1,4,5,8-dimethano-naphthalene. Compounds similar but resulting from the addition of more bridged ring units by further condensation with cyclopentadiene can also be used.

The polyenes are used singly or in combination in the polymerization with the mono-olefin. Preferably, the polyene is a diene, advantageously an aliphatic diene, having an olefinic double bond at both terminals, in other words an alpha-omega diene, containing from 8 to 18 carbon atoms. More preferably, the polyene is an aliphatic alpha-omega diene containing from 10 to 18 carbon atoms. Interpolymers containing units derived from 1,9-decadiene are highly preferred. Highly preferred are interpolymers comprising units derived from ethylene, from an alpha-olefin with from 3 to 12 carbon atoms, preferably from 4 to 8 carbon atoms, and from 1,9-decadiene.

Generally, the interpolymers of the present invention have a density of from 0.85 $g/cm^3$ to 0.97 $g/cm^3$, preferably up to 0.96 $g/cm^3$. For interpolymers containing units derived from ethylene and an alpha-olefin of at least three carbon atoms, the density of the interpolymer is mainly determined by the amount of alpha-olefin incorporated in the interpolymer. The higher the alpha-olefin content, the lower the density.

Interpolymers wherein the alpha-olefin comprises ethylene and a further alpha-olefin containing 3 to 18 carbon atoms preferably have a density of from 0.85 $g/cm^3$ to 0.92 $g/cm^3$, more preferably of from 0.85 $g/cm^3$ to 0.91 $g/cm^3$, most preferably of from 0.86 $g/cm^3$ to 0.89 $g/cm^3$. The amounts of alpha-olefin other than ethylene included in the interpolymers generally range from 0 mole percent for the interpolymers of about 0.96 $g/cm^3$ to about 17 mole percent for interpolymers of a density of 0.85 $g/cm^3$. For the highly preferred density range of 0.86 $g/cm^3$ to 0.89 $g/cm^3$ the amount of alpha-olefin is between about 15 and about 5 mole percent.

The polyene in the amounts incorporated in the interpolymer of the present invention has a slight effect on the density of the interpolymer in a sense that the density is slightly decreased, typically with 0.001 $g/cm^3$ to 0.02 $g/cm^3$ units. The polyene content is typically not used to adjust the density, but is primarily used to adjust the product properties such as melt tension and processability. Typical polyene contents in the interpolymer range from 0.005 to 0.7 mole percent, preferred polyene content is from 0.02 to 0.2 mole percent. For the highly preferred interpolymers containing 1,9-decadiene units, the preferred polyene content is from 0.02 to 0.19 mole percent, most preferably from 0.02 to 0.1 mole percent.

Melt flow rate values specified in the present application without giving measurement conditions were determined in accordance with ASTM D-1238, Condition 190° C. at an applied load of 2.16 kg. Sometimes the MFR determined under these conditions is referred to as $I_2$. $I_{10}$ is measured according to ASTM Designation D 1238 using conditions of 190° C. and 10.0 kg mass. Preferred interpolymers have an $I_2$ generally in the range from 0.001 to 100 g/10 min., preferably from 0.05 to 50 g/10 min., more preferably from 0.1 to 15 g/10 min., and most preferably from 0.2 to 5 g/10 min.

The interpolymers used in the present invention generally have a molecular weight distribution ($M_w M_n$) as determined by gel permeation chromatography from 1.8 to 5. The term molecular weight distribution as used herein, also referred to as "polydispersity", is the weight average molecular weight ($M_w$) divided by the number average molecular weight ($M_n$) and is determined as follows.

The polymer or composition samples are analyzed by gel permeation chromatography (GPC) on a Waters 150° C. high temperature chromatographic unit equipped with three mixed porosity columns (Polymer Laboratories $10^3$, $10^4$, $10^5$, and $10^6$) operating at a system temperature of 140° C. The solvent is 1,2,4-trichlorobenzene, from which 0.3 percent by weight solution of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polymer molecular weights are determined by using appropriate Mark-Houwink coefficients for polyethylene and polystyrene (as described by Williams and Ward in *Journal of Polymer Science, Polymer Letters*, Vol. 6, (621) 1968, to derive the following equation:

$M_{polyethylene} = a*(M_{polystyrene})^b$.

In this equation, a=0.4316 and b=1.0. Weight average molecular weight, $M_w$, is calculated in the usual manner according to the following formula: $M_w = \Sigma_i w_i * M_i$, where $w_i$ and $M_i$ are the weight fraction and molecular weight, respectively, of the $i^{th}$ fraction eluting from the GPC column. The highly preferred interpolymers comprising units derived from ethylene, from an alpha-olefin with from 3 to 12 carbon atoms, preferably from 4 to 8 carbon atoms, and from 1,9-decadiene, preferably have a molecular weight distribution, $M_w/M_n$, from 2.0 to 4.0.

The interpolymer is employed in the blends of the present invention in amounts sufficient to provide the desired balance of processability and impact resistance. In general, the interpolymer is employed in amounts of at least about 5 parts by weight, preferably at least about 10 parts by weight, more preferably at least about 15 parts by weight, even more preferably at least about 20 parts by weight and most preferably at least about 25 parts by weight based on the weight of the total composition. In general, the interpolymer is used in amounts less than or equal to about 65 parts by weight, preferably less than or equal to about 55 parts by weight, more preferably less than or equal to about 45 parts by weight, even more preferably less than or equal to about 35 parts by weight and most preferably less than or equal to about 25 parts by weight based on the weight of the total composition.

The propylene polymer composition comprises component (c) a filler such as calcium carbonate, talc, clay, mica, wollastonite, hollow glass beads, titaninum oxide, silica, carbon black, glass fiber or potassium titanate. Preferred fillers are talc, wollastonite, clay, single layers of a cation exchanging layered silicate material or mixtures thereof. Talcs, wollastonites, and clays are generally known fillers for various polymeric resins. See for example U.S. Pat. No. 5,091,461 and 3,424,703; EP 639,613 A1; and EP 391,413, where these materials and their suitability as filler for polymeric resins are generally described.

Preferred talcs and clays are uncalcined having very low free metal oxide content. The mineral talcs best suited are hydrated magnesium silicates as generally represented by the theoretical formula

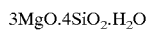

Compositions of talcs may vary somewhat with locality in which they are mined. Montana talcs, for example, closely approach this theoretical composition. Suitable mineral talcs of this type are commercially available as PREVER™ M8 available from Luzenac.

Examples of preferred cation exchanging layered silicate materials include biophilite, kaolinite, dickalite or talc clays; smectite clays; vermiculite clays; mica; brittle mica; Magadiite; Kenyaite; Octosilicate; Kanemite; and Makatite. Preferred cation exchanging layered silicate materials are smectite clays, including montmorillonite, bidelite, saponite and hectorite.

Preferred fillers have an average length to thickness ratio (L/T) preferably from about 1 to about 10,000 and provide the desired levels of physical and other property requirements such as toughness and stiffness (modulus). Several varieties of cation exchanging layered silicate materials, talc, wollastonite, clay and mixtures thereof have been found to be especially suitable.

The suitability of cation exchanging layered silicate material fillers in maintaining the preferred levels of toughness and stiffness of molded articles prepared from the resin has been found to be a function of the average L/T of the filler particles together with obtaining a uniformly small particle-sized filler. Highly preferred are those compositions incorporating fillers having an average L/T as measured according to the below-described technique of at least about 1, preferably at least about 15, more preferably at least about 50, even more preferably at least about 100, and most preferably at least about 200. With regard to the maximum level for the L/T ratio, it has been found desirable to have a value up to and including about 10,000, preferably up to and including about 5,000, more preferably up to and including about 1,000, even more preferably up to and including about 500, and most preferably up to and including about 200.

The suitability of non-cation exchanging layered silicate material fillers, such as calcium carbonate, talc, clay, mica, wollastonite, hollow glass beads, titaninum oxide, silica, carbon black, glass fiber, potassium, titanate, etc., in maintaining the preferred levels of toughness and stiffness of molded articles prepared from the resin has been found to be a function of the average L/T of the filler particles together with obtaining a uniformly small particle-sized filler. Highly preferred are those compositions incorporating non-cation exchanging layered silicate material fillers having an average L/T as measured according to the below-described technique of at least about 1, preferably at least about 1.5, more preferably at least about 2, even more preferably at least about 3, and most preferably at least about 4. With regard to the maximum level for the L/T ratio for non-cation exchanging layered silicate material fillers, it has been found desirable to have a value up to and including about 30, preferably up to and including about 20, more preferably up to and including about 15, even more preferably up to and including about 10, and most preferably up to and including about 4.

For determining the particle size and L/T ratio, the length of the fillers (or longest dimension, such as the diameter of a plate-shaped particle) as well as their thickness (shortest dimension of the 2 dimensions measurable) can be measured by preparing a filler modified polymeric resin sample and measuring the particle dimensions of the dispersed particles from digitized images produced by back scattered electron imaging using a scanning electron microscope and analyzing the digitized images in an image analyzer. Preferably, the size of the image is at least 10× the size of the maximum particle size.

The propylene polymer compositions included within the scope of this invention generally utilize such inorganic fillers with a number average particle size as measured by back scattered electron imaging using a scanning electron microscope of less than or equal to about 10 micrometers (μm) preferably less than or equal to about 3 μm, more preferably less than or equal to about 2 μm, more preferably less than or equal to about 1.5 μm and most preferably less than or equal to about 1.0 μm. In general, smaller average particle sizes equal to or greater than about 0.001 μm, preferably equal to or greater than about 0.01 μm, more preferably equal to or greater than about 0.1 μm, or most preferably equal to or greater than 0.5 μm, if available, could very suitably be employed.

The filler is employed in an amount of at least about 1 part by weight, preferably at least about 3 parts by weight, more preferably at least about 5 parts by weight, even more preferably at least about 10 parts by weight, and most preferably at least about 15 parts by weight based on the total weight of the composition. Usually it has been found sufficient to employ an amount of filler up to and including about 50 parts by weight, preferably up to and including about 40 parts by weight, more preferably up to and including about 30 parts by weight, more preferably up to and including about 25 parts by weight, more preferably up to and including about 20 parts by weight, and most preferably up to and including about 15 parts by weight based the total weight of the composition.

Optionally, the propylene polymer composition comprises component (d) an additional polymer which is a resin other than components (a) and (b) above. Preferred additional polymers are polyethylene, preferably low density polyethylene, linear low density polyethylene (LLDPE), high density polyethylene (HDPE), for example HDPE 96003E high density polyethylene available from The Dow Chemical Company; polystyrene; polycyclohexylethane; polyesters, such as polyethylene terephthalate; ethylene/styrene interpolymers; syndiotatic PP; syndiotactic PS; ethylene/propylene copolymers; EPDM; and mixtures thereof If present, the additional polymer is employed in amounts of at least about 1 part by weight, preferably at least about 3 parts by weight, more preferably at least about 5 parts by weight, even more preferably at least about 7 parts by weight and most preferably at least about 10 parts by weight based on the weight of the total composition. In general, the additional polymer is used in amounts less than or equal to about 40 parts by weight, preferably less than or equal to about 30 parts by weight, more preferably less than or equal to about 20 parts by weight, even more preferably less than or equal to about 15 parts by weight and most preferably 10 parts by weight based on the weight of the total composition.

The compositions of the present invention can comprise a slip agent. Preferred slip agents are a saturated fatty acid amide or ethylenebis(amide), an unsaturated fatty acid amide or ethylenebis(amide) or combinations thereof. The saturated fatty amides useful in the present invention conform essentially to the empirical formula $$RC(O)NHR^1$$

where R is a saturated alkyl group having of from 10 carbon atoms to 26 carbon atoms and $R^1$ is independently hydrogen or a saturated alkyl group having of from 10 carbon atoms to 26 carbon atoms. Compounds which conform to the above empirical structure are for example, palmitamide, stearamide, arachidamide, behenamide, stearyl stearamide, palmityl pamitamide, stearyl arachidamide and mixtures thereof.

The saturated ethylenebis(amides) useful in the present invention conform essentially to the empirical formula $$RC(O)NHCH_2CH_2NHC(O)R$$

where R is as defined previously. Compounds which conform to the above empirical structure are for example, stearamidoethylstearamide, stearamidoethylpalmitamide, palmitamido-ethylstearamide and mixtures thereof.

The unsaturated fatty amides useful in the present invention conform essentially to the empirical formula $$R^2C(O)NHR^3$$

where $R^2$ is an unsaturated alkyl group having of from 10 carbon atoms to 26 carbon atoms and $R^3$ is independently hydrogen or a unsaturated alkyl group having of from 10 carbon atoms to 26 carbon atoms. Compounds which conform to the above empirical structure are for example, oleamide, erucamide, linoleamide, and mixtures thereof.

The unsaturated ethylenebis(amides) useful in the present invention conform essentially to the empirical formula $$R^4C(O)NHCH_2CH_2NHC(O)R^4$$

where $R^4$ is either a saturated or unsaturated alkyl group having of from 10 carbon atoms to 26 carbon atoms with the proviso that at least one of $R^4$ is unsaturated. Compounds which conform to the above empirical structure include, erucamidoethylerucamide, oleamidoethyloleamide, erucamidoethyloleamide, oleamidoethylerucamide, stearamidoethylerucamide, erucamidoethylpalmitamide, palmitamidoethyloleamide and mixtures thereof.

Generally preferred concentrations of the saturated fatty acid amide or ethylene-bis(amide) are in the range of from about 0 parts to about 0.5 parts by weight, preferably of from about 0.025 parts to about 0.25 parts by weight and most preferably of from about 0.05 parts to about 0.15 parts by weight based on the weight of the total composition. Generally, preferred concentrations of the unsaturated fatty acid amide or ethylene-bis(amide) are in the range of from about 0 parts to about 1 parts by weight, preferably of from about 0.05 parts to about 0.75 parts by weight and most preferably of from about 0.1 parts to about 0.3 parts by weight based on the weight of the total composition.

Further, the claimed propylene polymer compositions may also optionally contain one or more additives that are commonly used in propylene polymer compositions of this type. Preferred additives of this type include, but are not limited to: ignition resistant additives, stabilizers, colorants, antioxidants, antistats, flow enhancers, silicon oils, such as polydimethylsiloxanes, mold releases, such as metal stearates (e.g., calcium stearate, magnesium stearate), nucleating agents, including clarifying agents, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least about 0.01 parts, preferably at least about 0.1 parts, more preferably at least about 1 parts, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the propylene polymer compositions of this invention can be accomplished by any suitable mixing means known in the art, including dry blending the individual components and subsequently melt mixing, either directly in the extruder used to make the finished article (e.g., the automotive part), or pre-mixing in a separate extruder (e.g., a Banbury mixer). Dry blends of the compositions can also be directly injection molded without pre-melt mixing. Alternatively, the propylene polymer and the substantially linear ethylene polymer or linear ethylene polymer may be prepared in the same reactor.

The propylene polymer compositions of the present invention are thermoplastic. When softened or melted by the application of heat, the polymer blend compositions of this invention can be formed or molded using conventional techniques such as compression molding, injection molding, gas assisted injection molding, calendering, vacuum forming, thermoforming, extrusion and/or blow molding, alone or in combination. The polymer blend compositions can also be formed, spun, or drawn into films, fibers, multi-layer laminates or extruded sheets, or can be compounded with one or more organic or inorganic substances, on any machine suitable for such purpose. The propylene polymer compositions of the present invention are preferably injection molded. Some of the fabricated articles include exterior and interior automotive trims, for example, bumper beams, bumper fascia, pillars, instrument panels and the like; in electrical and electrical equipment device housing and covers; as well as other household and personal articles, including, for example, appliance housings, housewares, freezer containers, and crates; lawn and garden furniture; and building and construction sheet.

To illustrate the practice of this invention, examples of the preferred embodiments are set forth below. However, these examples do not in any manner restrict the scope of this invention.

EXAMPLES

The compositions of Comparative Examples A and B and Examples 1 to 3 were compounded on a co-rotating twin screw Collin ZK-50/R DGL (L/D-12) extruder. All components were dry blended prior to feeding through a K-tron loss-and-weight feeder. Extruder output was 10 kilograms per hour (kg/h.). The following were the compounding conditions on the ZK-50/R extruder: Barrel temperature profile: 200° C., 210° C., 220° C., 230° C.; Die temperature: 230° C.; Melt temperature: 220° C.; Screw speed: 100 revolutions per minute (rpm). The extrudate was cooled in the form of strands and comminuted as pellets using a Sheer SGS 50-E pelletizer. The pellets were used to prepare test specimens on a 100 ton Demag injection molding machine, having the following molding conditions: Barrel temperature profile: 200° C., 205° C., 230° C., 220° C., and 220° C.; Melt temperature: 225° C.; and Cycle time: 85 seconds.

The formulation content of Comparative Examples A and B and Examples 1 to 3 are given in Table 1 below in parts by weight of the total composition. In Table 1:

"PP-1" is a polypropylene available as INSPIRE™ C704-07 available from The Dow Chemical Company having a density of 0.9 g/cm$^3$, a melt flow rate of 7 g/10 min. at 230° C. and an applied load of 2.16 kg;

"PP-2" is a polypropylene available as INSPIRE C705-44NAHP available from The Dow Chemical Company having a density of 0.9 g/cm$^3$, a melt flow rate of 44 g/10 min. at 230° C. and an applied load of 2.16 kg;

"PP-3" is a polypropylene available as ADSTIF™ V2400G available from Montell having a density of 0.9 g/cm$^3$, a melt flow rate of 20 g10 min. at 230° C. and an applied load of 2.16 kg;

"SLEP" is a substantially linear ethylene/octene copolymer available as AFFINITY™ EG 8150 from The Dow Chemical Company having a density of 0.868 g/cm$^3$, a melt flow rate of 0.5 g/10 min. determined at 190° C. and an applied load of 2.16 kg;

"IP-1" in an interpolymer prepared from a metallocene catalyst comprising ethylene, 1-octene, and 1,9-decadiene having an $I_2$ of 0.5 g10 min., a density of 0.868 g/cm$^3$, and a MT greater than 2.2 gram;

"IP-2" is an interpolymer prepared from a metallocene catalyst comprising ethylene, 1-octene, and 1,9-decadiene having an $I_2$ of 3 g/10 min., a density of 0.862 g/cm$^3$, and a MT of 7.65 gram;

"HDPE" is a high density polyethylene available as HDPE 96003E from the Dow Chemical Company having a density of 0.960 g/cm$^3$ and a melt flow rate of 1 g/10 min. determined at 190° C. and an applied load of 2.16 kg;

"TALC" is a commercially available mineral talc available as PREVER M8 from Luzenac having a median particle size of 2-3 $\mu$m and a maximum particle size of 8 $\mu$m;

"Erucamide" is an unsaturated fatty amide with the formula $C_{21}H_{41}CONH_2$ available as KEMAMIDE™ from Witco;

"Silicon oil" to improve surface lubricity is a 50 percent concentrate of polydimethylsiloxane in polypropylene available as MB50-001 from Dow Corning;

"IRGANOX B 215" antioxidant available from Ciba Geigy is a 1:2 mixture of 3,5-bis(1,1-dimethylethyl)-4-hydroxy-2,2-bis[3-[3,5-bis(1,1-dimethylethyl)-4-hydroxyphenyl] oxo-propoxy]methyl-1,3-propanediyl ester with tris(2,4-di-tert-butylphenyl phosphite;

"Color" is Plasblack 4045 from Cabot (Comparative Example A and Examples 1 and 2) or pigments (Comparative Example B and Example 3).

The following tests were run on Comparative Examples A and B and Examples 1 to 3 and the results of these tests are shown in Table 2:

"MFR" melt flow rate was determined according to ISO 1133 on a Zwick 4106 plastometer at 230° C. and an applied load of 2.16 kg;

"Flexural Modulus" was determined in accordance with ISO 178. Testing was performed using an Instron mechanical tester at a rate of 2mm/min.;

"Tensile Properties" were done in accordance with ISO 527. Testing was performed using an Instron mechanical tester;

"Notched Izod" was determined according to ISO 180/A1 at 23° C. and 0° C. Specimens were cut from rectangular HDT bars and measured 4 mm in thickness. The specimens were notched with a notcher to give a 250 micrometer ($\mu$) radius notch. A Zwick Izod impact testing unit was used;

"Dart" instrumented impact was determined according to ISO 6603 using a J&B instrumented impact tester with a 23.246 kg weight. Test results were determined at 23° C., 0° C. and –10° C. A cold chamber was used to cool the 0° C. and –10° C. samples prior to testing;

"Scratch Resistance-1" was determined according to Ford Standard FLTM BN 108-13 measuring minimum load required to obtain visual scratches after scratching with a 1 mm styles, results are reported in Newtons (N);

"Scratch Resistance-2" was determined according to Renault Standard D42 1775 using a stamp with sandpaper which is applied with certain force and frequency on the grained surface and delta E (dE) is measured before after the test on a Data Color International DC3890 spectrophotometer;

"Scratch resistance-3" was determined according to standard GME 60280 from GM where 1 mm styles were applied at 5 mm and 1200 mm/min. to get cross hatch of scratches, delta L (DL) is measured before and after scratching on a Data Color International DC3890 spectrophotometer.

TABLE 1

| PROPERTIES | COMPARATIVE EXAMPLE | | EXAMPLE | | |
|---|---|---|---|---|---|
| | A | B | 1 | 2 | 3 |
| PP-1 | 50.2 | 52.2 | | | |
| PP-2 | 18 | 18 | | | |
| PP-3 | | | 55.2 | 54.7 | 57.2 |
| SLEP | 5 | 5 | | | |
| IP-1 | | | 18 | 18 | |
| IP-2 | | | | | 18 |
| HDPE | 5 | 5 | 5 | 5 | 5 |
| Talc | 15 | 15 | 15 | 15 | 15 |
| Erucamide | 0.5 | 0.5 | 0.5 | | .05 |
| Silicon oil | | | | 1 | |
| IRGANOX B215 | 0.3 | 0.3 | 0.3 | 0.3 | 0.3 |
| Color | 6 | 4 | 6 | 6 | 4 |

TABLE II

| PROPERTIES | COMPARATIVE EXAMPLE | | EXAMPLE | | |
|---|---|---|---|---|---|
| | A | B | 1 | 2 | 3 |
| MFR @ 230° C./kg, g/10 min. | 9.9 | 9.6 | 8.3 | 7 | 12 |
| Flexural Modulus, MPa | 1,900 | 1,820 | 1,520 | 1,700 | 1,500 |
| Tensile Properties | | | | | |
| Strength at Yield, MPa | 22 | 20 | | | 21.4 |
| Strength at Break, MPa | 17 | 19 | | | 12 |
| Elongation at Yield, % | 4.7 | 4.7 | | | 9 |
| Elongation at Break, % | 50 | 40 | | | 36 |
| Modulus, MPa | 2,000 | 1900 | | | 1,650 |
| Notch Izod, kJ/m$^2$ | | | | | |
| 23° C. | 43.6 | 30 | 29 | 25 | 41 |
| 0° C. | 10 | 11 | 6.4 | 6 | |
| Dart, Impact, J | | | | | |
| 23° C. | 55 | 59 | 53 | 49 | 57 |
| 0° C. | 37 | 56 | | | 47 |
| −10° C. | 28 | 56 | 34 | 34 | 47 |
| Deflection, mm | | | | | |
| 23° C. Deflection, mm | 25 | 26.4 | 35 | 34 | 28 |
| 0° C. Deflection, mm | 17 | 26 | | | 25 |
| −10° C. Deflection, mm | 13 | 23 | 27 | 26 | 22 |
| Scratch Resistance-1, N | 7 | 3 | >15 | 3 | |
| Scratch Resistance-2, dE | 1 | 1 | 0.4 | 0.4 | |
| Scratch Resistance-3, dL | 0.6 | 1.8 | | | 0.4 |

What is claimed is:

1. A propylene polymer composition comprising:

(a) from about 40 to about 85 parts by weight of an isotactic propylene polymer, (b) from about 10 to about 55 parts by weight of an interpolymer prepared from a metallocene catalyst having (i) a density, d, of from about 0.85 to about 0.97 g/cm$^3$ as measured in accordance with ASTM D-792, (ii) a melt flow rate, $I_2$, from about 0.001 to about 50 g/10 min as measured in accordance with ASTM D-1238, Condition 190° C./2.16 kg, and (iii) a melt tension of the interpolymer satisfying the following relationship:

$$MT > 1.328 - 0.7879\log(I_2) + 22.5(d-0.85) - 40.56\{\log(I_2)\} \times (d-0.85)$$

wherein MT represents the melt tension in grams, (c) from about 5 to about 50 parts by weight of a filler, (d) from about 0.025 to about 1.0 parts by weight of a slip agent selected from the group consisting of a saturated fatty acid amide, a saturated ethylenebis(amide), an unsaturated fatty acid amide, an unsaturated ethylenebis(amide) and mixtures thereof, and (e) from 0 to about 15 parts by weight of an additional polymer, wherein parts by weight are based on the total weight of the propylene polymer composition.

2. The propylene polymer composition of claim 1 wherein the isotatic propylene polymer is a homopolymer of propylene.

3. The propylene polymer composition of claim 1 wherein the isotatic propylene polymer is a copolymer of propylene and a $C_2$ or $C_4$ to $C_{20}$ alpha-olefin.

4. The propylene polymer composition of claim 1 wherein the interpolymer prepared from a metallocene catalyst comprises ethylene, an alpha-olefin containing 3 to 18 carbon atoms, and a non-conjugated alpha-omega diene having at least 7 carbon atoms and having two readily polymerizable double bonds.

5. The propylene polymer composition of claim 4 wherein the non-conjugated alpha-omega diene of the interpolymer is 1,9-decadiene.

6. The propylene polymer composition of claim 4 wherein the alpha-olefin of the interpolymer is 1-octene.

7. The propylene polymer composition of claim 1 wherein the filler is present in an amount from about 3 to about 15 parts by weight.

8. The propylene polymer composition of claim 7 wherein the filler is talc, wollastonite, clay, single layers of a cation exchanging layered silicate material or mixtures thereof.

9. The propylene polymer composition of claim 7 wherein the filler is talc.

10. The propylene polymer composition of claim 7 wherein the filler has a length to thickness ratio between 1 to 10,000.

11. The propylene polymer of claim 7 wherein the filler has an average particle size of about 0.001 to about 10 microns.

12. The propylene polymer composition of claim 1 wherein the additional polymer is present in an amount from about 5 to about 15 parts by weight.

13. The propylene polymer composition of claim 12 wherein the additional polymer is a high density polyethylene.

14. The propylene polymer of claim 1 comprising from about 0.1 to about 1 parts by weight of an unsaturated fatty acid amide selected from erucamide, oleamide, linoleamide, steramide or mixtures thereof.

15. A method for preparing a propylene polymer composition comprising the step of combining:

(a) from about 40 to about 85 parts by weight of an isotactic propylene polymer, (b) from about 10 to about 55 parts by weight of an interpolymer prepared from a metallocene catalyst having (i) a density, d, of from about 0.85 to about 0.97 g/cm3 as measured in accordance with ASTM D-792, (ii) a melt flow rate, I2, from about 0.001 to about 50 g/10 min as measured in accordance with ASTM D-1238, Condition 190° C./2.16 kg, and (iii) a melt tension of the interpolymer satisfying the following relationship:

$$MT > 1.328 - 0.7879 \log(I2) + 22.5(d-0.85) - 40.56\{\log(I2)\} \times (d-0.85)$$

wherein MT represents the melt tension in grams, (c) from 5 to about 50 parts by weight of a filler, (d) from about 0.025 to about 1.0 parts by weight of a slip agent selected from the group consisting of a saturated fatty acid amide, a saturated ethylenebis(amide), and unsaturated fatty acid amide, an unsaturated ethylenebis(amide) and mixtures thereof, and (e) from 0 to about 15 parts by weight of an additional polymer, wherein parts by weight are based on the total weight of the propylene polymer composition.

16. A method for producing a molded or extruded article of a polymer blend composition comprising the steps of:

(A) preparing a propylene polymer composition comprising:

(a) from about 40 to about 85 parts by weight of an isotactic propylene polymer, (b) from about 10 to about 55 parts by weight of an interpolymer prepared from a metallocene catalyst having (i) a density, d, of from about 0.85 to about 0.97 g/cm3 as measured in accordance with ASTM D-792, (ii) a melt flow rate, I2, from about 0.001 to about 50 g/10 min as measured in accordance with ASTM D-1238, Condition 190° C./2.16 kg, and (iii) a melt tension of the interpolymer satisfying the following relationship:

$$MT > 1.328 - 0.7879 \log(I2) + 22.5(d-0.85) - 40.56\{\log(I2)\} \times (d-0.85)$$

wherein MT represents the melt tension in grams, (c) from 5 to about 50 parts by weight of a filler, (d) from about 0.025 to about 1.0 parts by weight of a slip agent selected from the group consisting of a saturated fatty acid amide, a saturated ethylenebis (amide), an unsaturated fatty acid amide, an unsaturated ethylenebis(amide) and mixtures thereof, and (e) from 0 to about 15 parts by weight of an additional polymer, wherein parts by weight are based on the total weight of the propylene polymer composition and (B) molding or extruding said propylene polymer composition into molded or extruded article.

17. The method of claim 16 wherein the molded or extruded article is selected from the group consisting of an automotive bumper beam, an automotive bumper fascia, an automotive pillar, an automotive instrument panel, an electrical equipment device housing, an electrical equipment device cover, an appliance housing, a freezer container, a crate, and lawn and garden furniture.

18. The propylene polymer composition of claim 1 in the form of a molded or extruded article.

19. The molded or extruded article of claim 16 is selected from the group consisting of an automotive bumper beam, an automotive bumper fascia, an automotive pillar, an automotive instrument panel, an electrical equipment device housing, an electrical equipment device cover, an appliance housing, a freezer container, a crate, and lawn and garden furniture.

20. The propylene polymer of claim 1 comprising from about 0.025 to about 0.5 parts by weight of a saturated fatty acid amide selected from palmitamide, stearamide, arachidamide, behenamide, stearyl stearamide, palmityl pamitamide, stearyl arachidamide or mixtures thereof.

21. The propylene polymer of claim 1 comprising from about 0.025 to about 0.5 parts by weight of a saturated ethylenebis(amide) selected from the group consisting of stearamidoethylstearamide, stearamidoethylpalmitamide, palmitamidoethylstearamide and mixtures thereof.

22. The propylene polymer of claim 1 comprising from about 0.1 to about 1 parts by weight of an unsaturated fatty ethylenebis(amide) selected from the group consisting of erucamidoethylerucamide, oleamidoethyloleamide, erucamidoethyloleamide, oleamidoethylerucamide, stearamidoethylerucamide, erucamidoethylpalmitamide, palmitamidoethyloleamide and mixtures thereof.

* * * * *